United States Patent
Woon et al.

(10) Patent No.: US 10,069,268 B2
(45) Date of Patent: Sep. 4, 2018

(54) ASSEMBLY APPARATUS

(71) Applicant: ZionTECH Pte Ltd, Singapore (SG)

(72) Inventors: Sin Wei Woon, Singapore (SG); Wen Kai Lin, Singapore (SG)

(73) Assignee: ZionTECH Pte Ltd, Singapore (SG)

(*) Notice: Subject to any disclaimer, the term of this patent is extended or adjusted under 35 U.S.C. 154(b) by 0 days.

(21) Appl. No.: 15/547,245

(22) PCT Filed: Jan. 27, 2016

(86) PCT No.: PCT/SG2016/050036
§ 371 (c)(1),
(2) Date: Jul. 28, 2017

(87) PCT Pub. No.: WO2016/126203
PCT Pub. Date: Aug. 11, 2016

(65) Prior Publication Data
US 2018/0013254 A1    Jan. 11, 2018

(30) Foreign Application Priority Data

Feb. 4, 2015    (SG) .............................. 10201500850S

(51) Int. Cl.
*B23P 19/04* (2006.01)
*H01R 43/20* (2006.01)

(52) U.S. Cl.
CPC .............. *H01R 43/20* (2013.01); *B23P 19/04* (2013.01); *Y10T 29/5142* (2015.01);
(Continued)

(58) Field of Classification Search
CPC ............. Y10T 29/5142; Y10T 29/5149; Y10T 29/5193; Y10T 29/53174; Y10T 29/53217; H01R 43/20; H01R 43/205
(Continued)

(56) References Cited

U.S. PATENT DOCUMENTS 3,641,649 A * 2/1972 Busler ..................... H01F 41/10
                                                    29/564.6
4,271,581 A    6/1981 Eitzinger
(Continued)

OTHER PUBLICATIONS

International Search Report and Written Opinion pertaining to International Patent Application No. PCT/SG2016/050036.
(Continued)

*Primary Examiner* — Erica E Cadugan
(74) *Attorney, Agent, or Firm* — Dinsmore & Shohl LLP

(57) ABSTRACT

An assembly apparatus (10) is provided. The assembly apparatus (10) includes a first feeding mechanism (12) arranged in use to feed a series of first components (14), a holding mechanism (16) arranged in use to hold consecutive ones of the first components (14) in place, a cutter (18) arranged in use to separate individual ones of the first components (14) while being held in place by the holding mechanism (16), an inserter (20) arranged in use to push a separated first component (14) into a corresponding opening in a second component (22), and a drive mechanism (24) coupled to each of the first feeding mechanism (12), the holding mechanism (16), the cutter (18) and the inserter (20). The drive mechanism (24) is arranged in use to synchronize movement of the first feeding mechanism (12), the holding mechanism (16), the cutter (18) and the inserter (20).

13 Claims, 6 Drawing Sheets

(52) U.S. Cl.
CPC ........ *Y10T 29/5149* (2015.01); *Y10T 29/5193* (2015.01); *Y10T 29/53174* (2015.01)

(58) Field of Classification Search
USPC .................. 29/564.6, 566.2, 33 M, 739, 749
See application file for complete search history.

(56) References Cited

U.S. PATENT DOCUMENTS

| | | | |
|---|---|---|---|
| 4,531,280 A | | 7/1985 | Bakermans |
| 4,763,400 A | * | 8/1988 | Deckers ............... H01R 43/205 |
| | | | 29/564.6 |
| 5,095,609 A | * | 3/1992 | Correll, Jr. .............. B23P 19/04 |
| | | | 29/564.2 |
| 6,807,719 B2 | * | 10/2004 | Herr ....................... H01R 43/20 |
| | | | 29/564.6 |

OTHER PUBLICATIONS

International Preliminary Report on Patentability pertaining to International Patent Application No. PCT/SG2016/050036 dated Aug. 8, 2017.

* cited by examiner

ASSEMBLY APPARATUS

FIELD OF THE INVENTION

The present invention relates to component assembly and more particularly to an assembly apparatus.

BACKGROUND OF THE INVENTION

Speed of assembly is an important consideration in manufacturing. Faster assembly speeds help reduce manufacturing cost. It is therefore desirable to have an apparatus for component assembly that is able to achieve faster assembly speeds.

SUMMARY OF THE INVENTION

Accordingly, in a first aspect, the present invention provides an assembly apparatus, the assembly apparatus including a first feeding mechanism arranged in use to feed a series of first components, a holding mechanism arranged in use to hold consecutive ones of the first components in place, a cutter arranged in use to separate individual ones of the first components while being held in place by the holding mechanism, an inserter arranged in use to push a separated first component into a corresponding opening in a second component, and a drive mechanism coupled to each of the first feeding mechanism, the holding mechanism, the cutter and the inserter. The drive mechanism is arranged in use to synchronise movement of the first feeding mechanism, the holding mechanism, the cutter and the inserter.

Other aspects and advantages of the invention will become apparent from the following detailed description, taken in conjunction with the accompanying drawings, illustrating by way of example the principles of the invention.

BRIEF DESCRIPTION OF THE DRAWINGS

The following detailed description of preferred embodiments of the invention will be better understood when read in conjunction with the appended drawings. The present invention is illustrated by way of example and is not limited by the accompanying figures, in which like references indicate similar elements. It is to be understood that the drawings are not to scale and have been simplified for ease of understanding the invention.

DETAILED DESCRIPTION OF THE INVENTION

Figure 1:
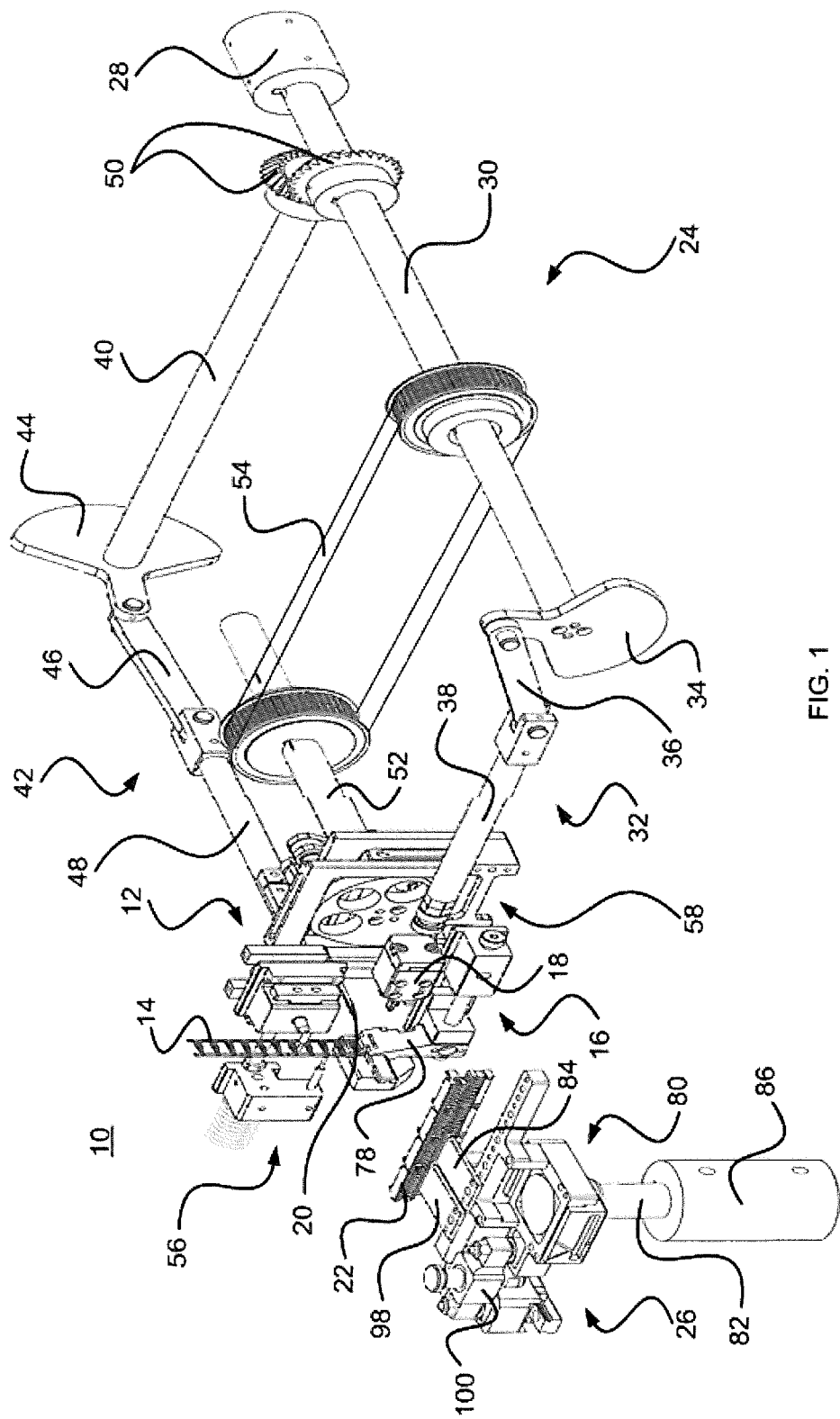
FIG. 1 is a schematic view of an assembly apparatus in accordance with one embodiment of the present invention.

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the scope of the invention. In the drawings, like numerals are used to indicate like elements throughout.

Referring now to FIG. 1, an assembly apparatus 10 for component assembly is shown. The assembly apparatus 10 includes a first feeding mechanism 12 arranged in use to feed a series of first components 14, a holding mechanism 16 arranged in use to hold consecutive ones of the first components 14 in place, a cutter 18 arranged in use to separate individual ones of the first components 14 while being held in place by the holding mechanism 16, an inserter 20 arranged in use to push a separated first component 14 into a corresponding opening (not shown) in a second component 22, and a drive mechanism 24 coupled to each of the first feeding mechanism 12, the holding mechanism 16, the cutter 18 and the inserter 20. The drive mechanism 24 is arranged in use to synchronise movement of the first feeding mechanism 12, the holding mechanism 16, the cutter 18 and the inserter 20.

Advantageously, by harnessing the various component processing elements 12, 16, 18 and 20 of the assembly apparatus 10 to a single drive mechanism 24, the problems of timing and coordination typically faced when trying to sync various component processing elements is eliminated. This then makes it possible to increase assembly speeds with the assembly apparatus 10 without compromising quality of the assembled product.

The assembly apparatus 10 of the present embodiment also includes a second feeding mechanism 26 arranged in use to receive a series of second components 22 and to position each of the second components 22 to receive corresponding ones of the first components 14.

In the embodiment shown, the drive mechanism 24 includes a first motor 28, a first or main drive shaft 30 extending from the first motor 28, and a first crank and slider assembly 32 coupling the cutter 18 to the first drive shaft 30. The first crank and slider assembly 32 is arranged in use to convert rotational motion of the first drive shaft 30 into reciprocating motion of the cutter 18. In the present embodiment, the first crank and slider assembly 32 includes a first crank 34 coupled to the first drive shaft 30, a first connector 36 coupled at a first end to the first crank 34, and a first slider 38 coupled at one end to a second end of the first connector 36 and at the other end to the cutter 18. In use, as the first crank 34 rotates about an axis of the first drive shaft 30, the first connector 36 alternately pulls at and pushes against the first slider 38 to generate the linear reciprocating motion of the cutter 18.

Advantageously, by having the cutter 18 coupled to the main drive shaft 30, the cutting force of the cutter 18 is maximised. This allows use of the assembly apparatus 10 in a range of applications including those that require a larger cutting force due, for example, to thicker component parts.

The drive mechanism 24 in the embodiment shown also includes a second drive shaft 40 coupled to the first drive shaft 30, the second drive shaft 40 extending transversely from the first drive shaft 30, and a second crank and slider assembly 42 coupling the inserter 20 to the second drive shaft 40. The second crank and slider assembly 42 is arranged in use to convert rotational motion of the second drive shaft 40 into reciprocating motion of the inserter 20. In the embodiment shown, the second crank and slider assembly 42 includes a second crank 44 coupled to the second drive shaft 40, a second connector 46 coupled at a first end to the second crank 44, and a second slider 48 coupled at one end to a second end of the second connector 46 and at the other end to the inserter 20. In use, as the second crank 44 rotates about an axis of the second drive shaft 40, the second connector 46 alternately pulls at and pushes against the second slider 48 to generate the linear reciprocating motion of the inserter 20. In use, the second drive shaft 40 harnesses torque from the first drive shaft 30 and uses this to synchronise rotation of the second crank 44 with the rotation of the first crank 34 and in this manner, the linear reciprocating movements of the cutter 18 and the inserter 20 are also synchronised. In the present embodiment, the second drive shaft 40 is coupled to the first drive shaft 30 by means of a pair of bevel gears 50. However, it should be understood by those of ordinary skill in the art that the present invention is not limited to coupling of the first and second drive shafts 30 and 40 by means of bevel gears. In alternative embodiments, the first and second drive shafts 30 and 40 may be coupled to one another by means of a sprocket and chain arrangement, an indexing drive or other motion transfer linkage means, for example.

In the embodiment shown, the drive mechanism 24 also includes a third drive shaft 52 coupled to the first drive shaft 30 and extending in parallel to the first drive shaft 30. In use, the third drive shaft 52, like the second drive shaft 40, harnesses torque from the first drive shaft 30 and uses this to synchronise the movements of the first feeding mechanism 12 and the holding mechanism 16 with the movements of the cutter 18 and the inserter 20. In the present embodiment, the third drive shaft 52 is coupled to the first drive shaft 30 by means of a timing belt 54. However, it should be understood by those of ordinary skill in the art that the present invention is not limited to coupling of the first and third drive shafts 30 and 52 by means of a timing belt. In alternative embodiments, the first and third drive shafts 30 and 52 may be coupled to one another by means of, for example, a sprocket arrangement, a chain drive or other motion transfer linkage means.

Although the main drive shaft 30 to which the first motor 28 is coupled is shown as being coupled to the cutter 18 in the present embodiment, it should be understood by those of ordinary skill in the art that the present invention is not limited by the layout of the drive shafts in the drive mechanism 24. Alternative arrangements of the drive shafts may be provided in alternative embodiments.

Figure 2:
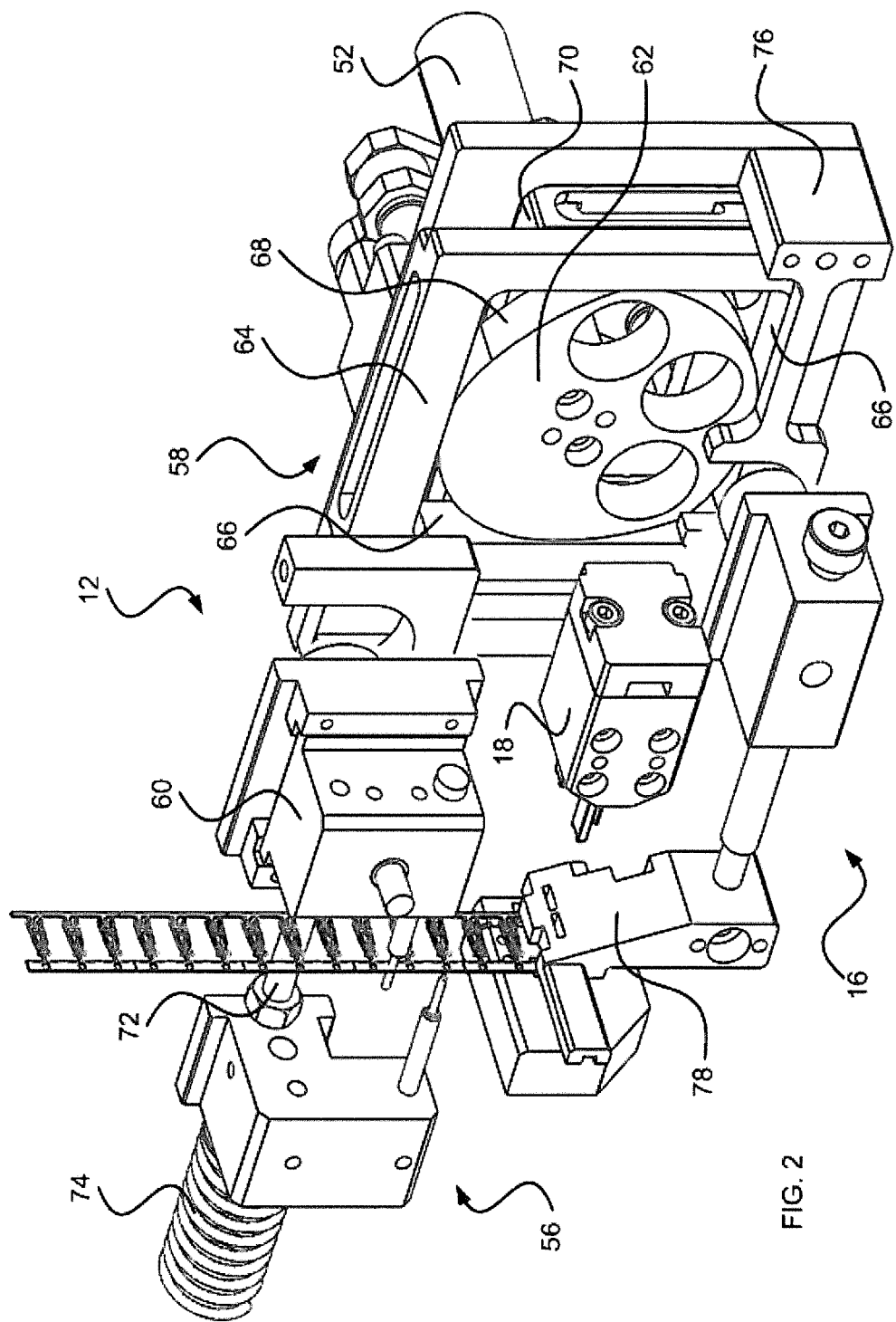
FIG. 2 is an enlarged perspective view of a first feeding mechanism, a holding mechanism and a locking mechanism of the assembly apparatus of FIG. 1.

Referring now to FIG. 2, an enlarged perspective view of the first feeding mechanism 12, the holding mechanism 16 and a locking mechanism 56 of the assembly apparatus 10 of FIG. 1 is shown.

The first feeding mechanism 12 includes a first cam assembly 58 coupled to the third drive shaft 52 and a first feeder 60 mounted on the first cam assembly 58. The first cam assembly 58 is arranged in use to convert rotational motion of the third drive shaft 52 into rotary reciprocating motion of the first feeder 60. In the present embodiment, the first cam assembly 58 includes a first cam 62 and a first frame 64 having a plurality of sides 66. The first cam 62 is received in the first frame 64 and has a surface profile 68 that is in contact with each of the sides 66 of the first frame 64 at any point in time. In the present embodiment, the first cam assembly 58 also includes a first guide 70 coupled to the first frame 64 in a crossed and sliding relationship. The first guide 70 is arranged in use to harness the horizontal movement of the first frame 64 and to guide movement of the first frame 64. Due to the design of the first cam assembly 58, the first cam 62 rotates in use within the first frame 64 about an axis of the third drive shaft 52, moving the first frame 64 in a rotary reciprocating motion (in the present embodiment, a squarish or rectangular pathway) that causes the attached first feeder 60 to engage, feed, disengage and then reengage with the series of first components 14 to feed the next component in the series. Advantageously, the closed loop design of the first cam assembly 58 helps lock in the movements of the first feeder 60, thereby making it possible to increase assembly speeds without creating stability and synchronization problems that would compromise the quality of the final assembled product.

In the embodiment shown, the locking mechanism 56 is arranged in use to lock the series of first components 14 in place when the first feeder 60 is not in engagement. More particularly, the locking mechanism 56 is coupled by a third connector 72 to the first feeder 60 and is biased in the present embodiment by a spring 74 towards the series of first components 14. Accordingly, when the first feeder 60 is pushed by the rotating first cam 62 towards the series of first components 14 and engages the series of first components 14, the third connector 72 pushes the locking mechanism 56 away from the series of first components 14 and the locking mechanism 56 disengages from the series of first components 14. When the first feeder 60 is pushed by the rotating first cam 62 away from the series of first components 14, the first feeder 60 disengages from the series of first components 14 and the spring 74 biases the locking mechanism 56 back into engagement with the series of first components 14. Advantageously, the locking mechanism 56 helps to lock the first components 14 in place during the cutting process, thereby increasing stability during and accuracy of the cutting process.

Figure 3:
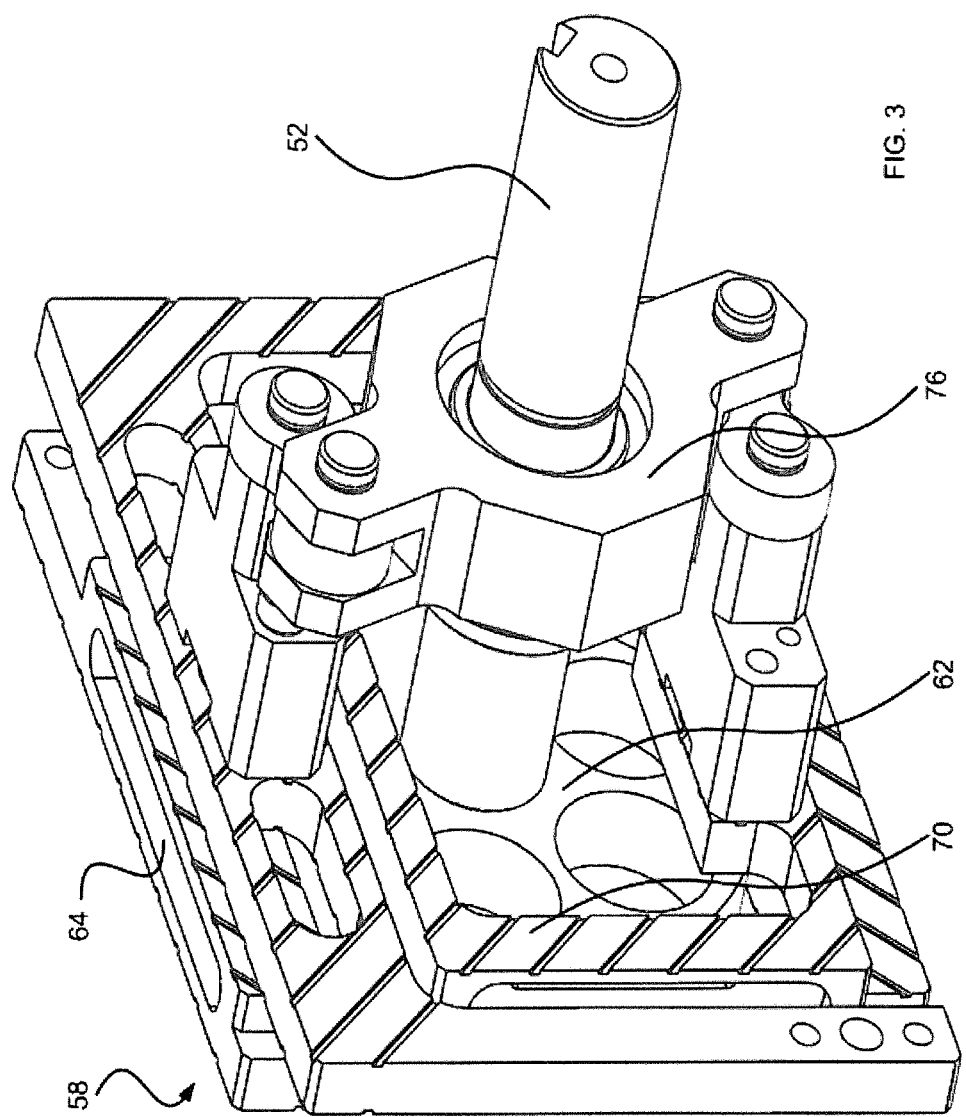
FIG. 3 is an enlarged rear perspective view of the first feeding mechanism and the holding mechanism shown in FIG. 2.

Referring now to FIGS. 2 and 3, the holding mechanism 16 of the present embodiment includes a first toggle mechanism 76 coupled to the third drive shaft 52 and a holder 78 attached to the first toggle mechanism 76. The first toggle mechanism 76 is arranged in use to convert rotational motion of the third drive shaft 52 into reciprocating motion of the holder 78. In use, the holder 78 moves alternatingly towards and then away from the series of first components 14 as the first components are being fed by the first feeding mechanism 12, thereby alternately holding and then releasing consecutive ones of first components 14.

Figure 4:
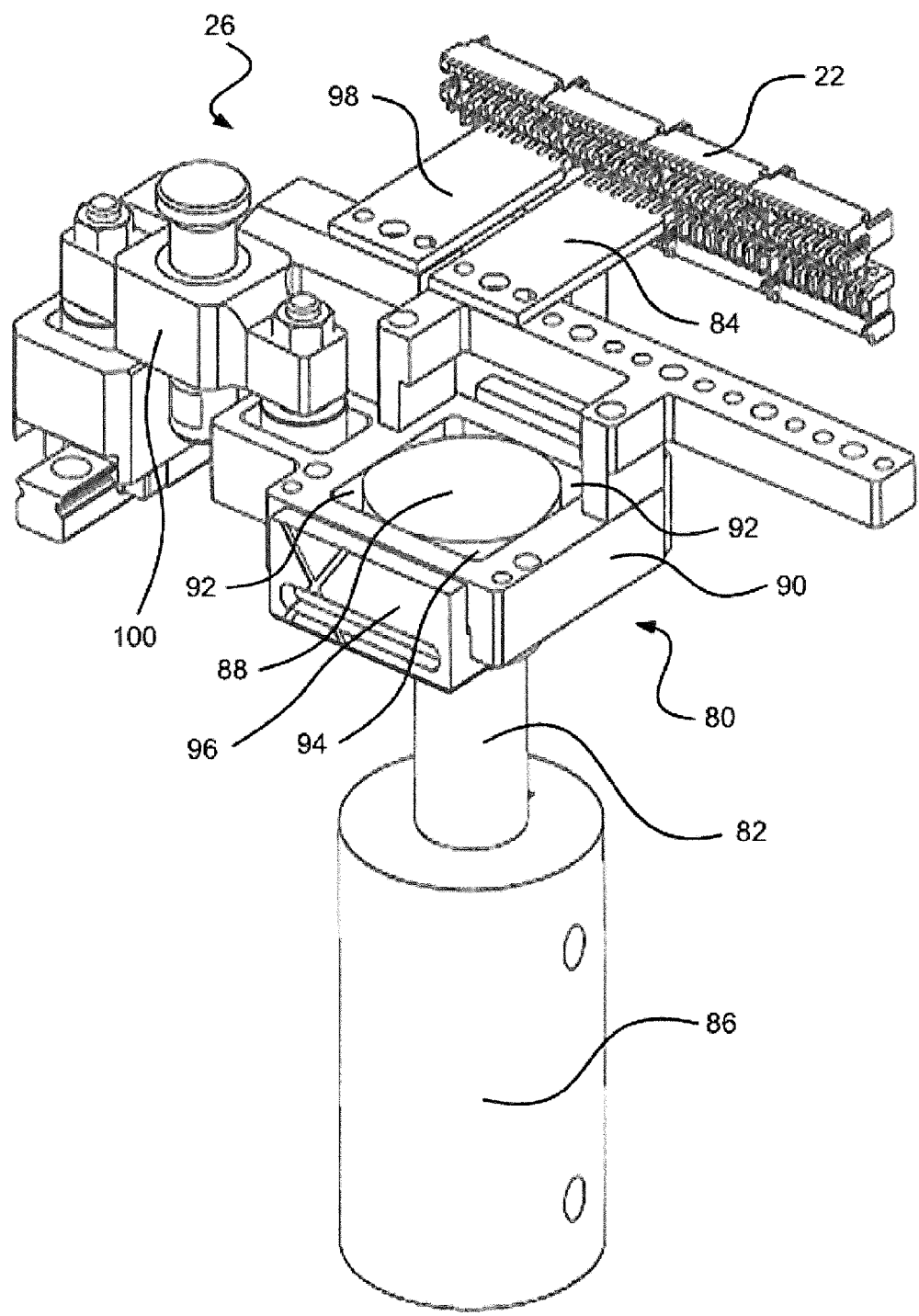
FIG. 4 is an enlarged perspective view of the second feeding mechanism of the assembly apparatus of FIG. 1.

Referring now to FIG. 4, an enlarged perspective view of the second feeding mechanism 26 of the assembly apparatus 10 of FIG. 1 is shown. In the present embodiment, the second feeding mechanism 26 includes a second cam assembly 80 coupled to a fourth drive shaft 82, and a second feeder 84 mounted on the second cam assembly 80. In the present embodiment, the fourth drive shaft 82 is coupled to and powered by a second motor 86. The second cam assembly 80 is arranged in use to convert rotational motion of the fourth drive shaft 82 into rotary reciprocating motion of the second feeder 84.

In the embodiment shown, the second cam assembly 80 includes a second cam 88 and a second frame 90 having a plurality of sides 92. The second cam 88 is received in the second frame 90 and has a surface profile 94 that is in contact with each of the sides 92 of the second frame 90 at any point in time. In the present embodiment, the second cam assembly 80 also includes a second guide 96 coupled to the second frame 90 in a crossed and sliding relationship. The second guide 96 is arranged in use to guide movement of the second frame 90 (in this particular embodiment, horizontal movement of the second frame 90). The second guide 96 also acts as a support for the second frame 90. Consequent to the design of the second cam assembly 80, the second cam 88 rotates in use within the second frame 90 about an axis of the fourth drive shaft 82, moving the second frame 90 in a rotary reciprocating motion (in the present embodiment, a squarish or rectangular pathway) that causes the attached second feeder 84 to engage, feed, disengage and then reengage consecutive ones of the second components 22 to feed the second components 22 during the assembly process. Advantageously, the closed loop design of the second cam assembly 80 helps lock in the movements of the second feeder 84, thereby making it possible to increase assembly speeds without creating stability and synchronization problems that would compromise the quality of the final assembled product.

In the present embodiment, the second feeding mechanism 26 also includes a stopper 98 and a second toggle mechanism 100 coupling the stopper 98 to the second cam assembly 80. The second toggle mechanism 100 is arranged in use to position the stopper 98 to lock the series of second components 22 in place when the second feeder 84 is not in engagement. More particularly, when the second feeder 84 is pushed by the rotating second cam 88 into engagement with one of the second components 22, the second toggle mechanism 100 draws the stopper 98 away from the series of second components 22 and the stopper 98 is thus disengaged from the series of second components 22. When the second feeder 84 is subsequently drawn by the rotating second cam 88 away from the series of second components 22, the second feeder 84 disengages from the second component 22 and the second toggle mechanism 100 instead pushes the stopper 98 into engagement with one of the second components 22, thereby locking the series of second components 22 in place. Advantageously, this series of alternately locking and unlocking respective ones of the second components 22 performed by the second feeder 84 and the stopper 98 helps stabilise the positioning of the second components 22 during a high speed indexing process.

Having described the various elements of the assembly apparatus 10, the operation of the assembly apparatus 10 will now be described below.

Referring again to FIG. 1, the first feeding mechanism 12 feeds consecutive ones of the first components 14 at intervals during the component assembly process. Each of the first components 14 is then held in turn by the holding mechanism 16. When one of the first components 14 is held in place by the holder 78, the cutter 18 moves in to cut and separate the first component 14 from the rest of the first components 14 before the inserter 20 moves in to push the separated first component 14 into a corresponding opening (not shown) in one of the second components 22. The second feeding mechanism 26 in turn moves consecutive ones of the second components 22 along at intervals to receive corresponding ones of the first components 14.

Figure 5:
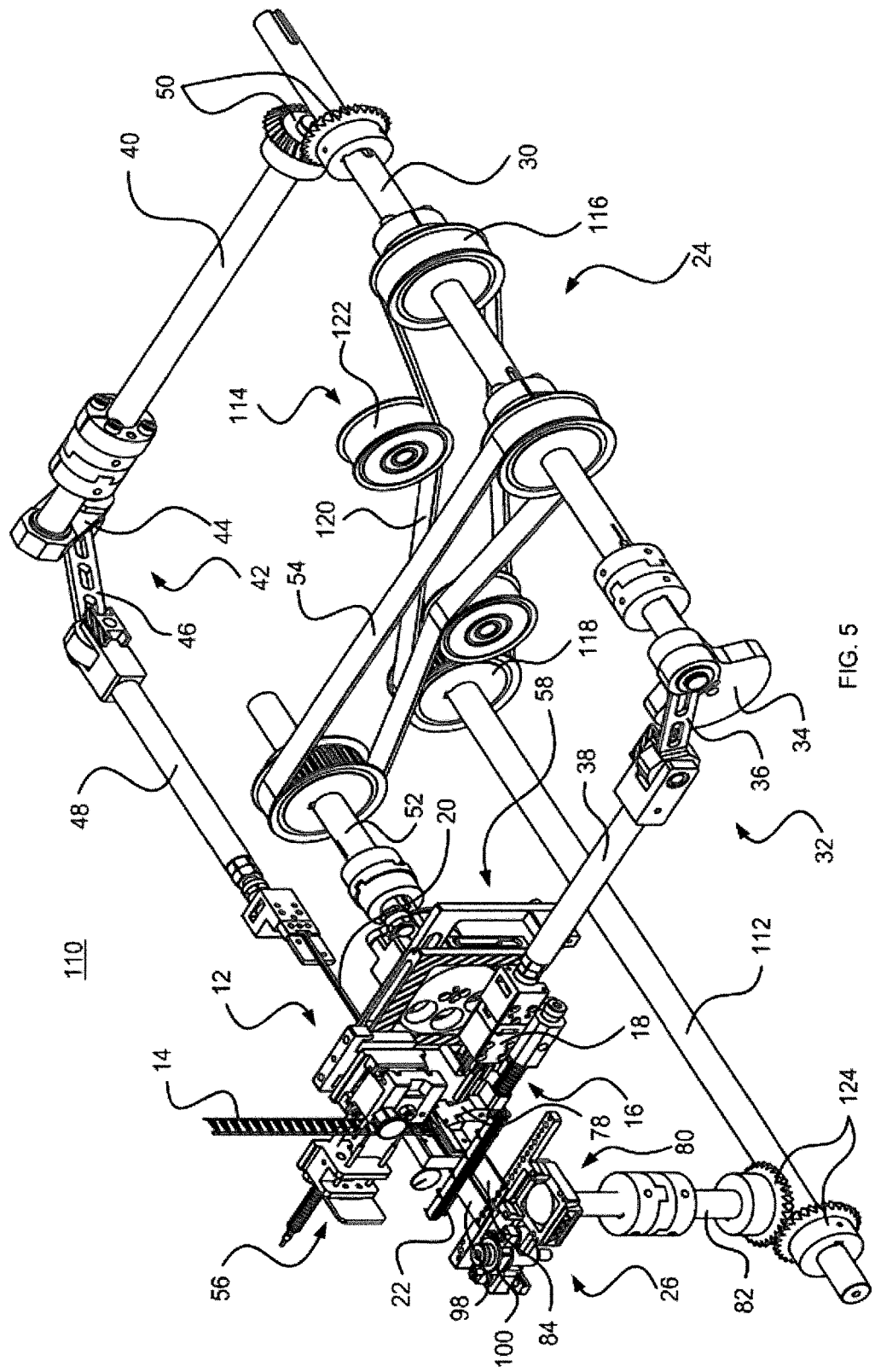
FIG. 5 is a schematic view from a first direction of an assembly apparatus in accordance with another embodiment of the present invention.
Figure 6:
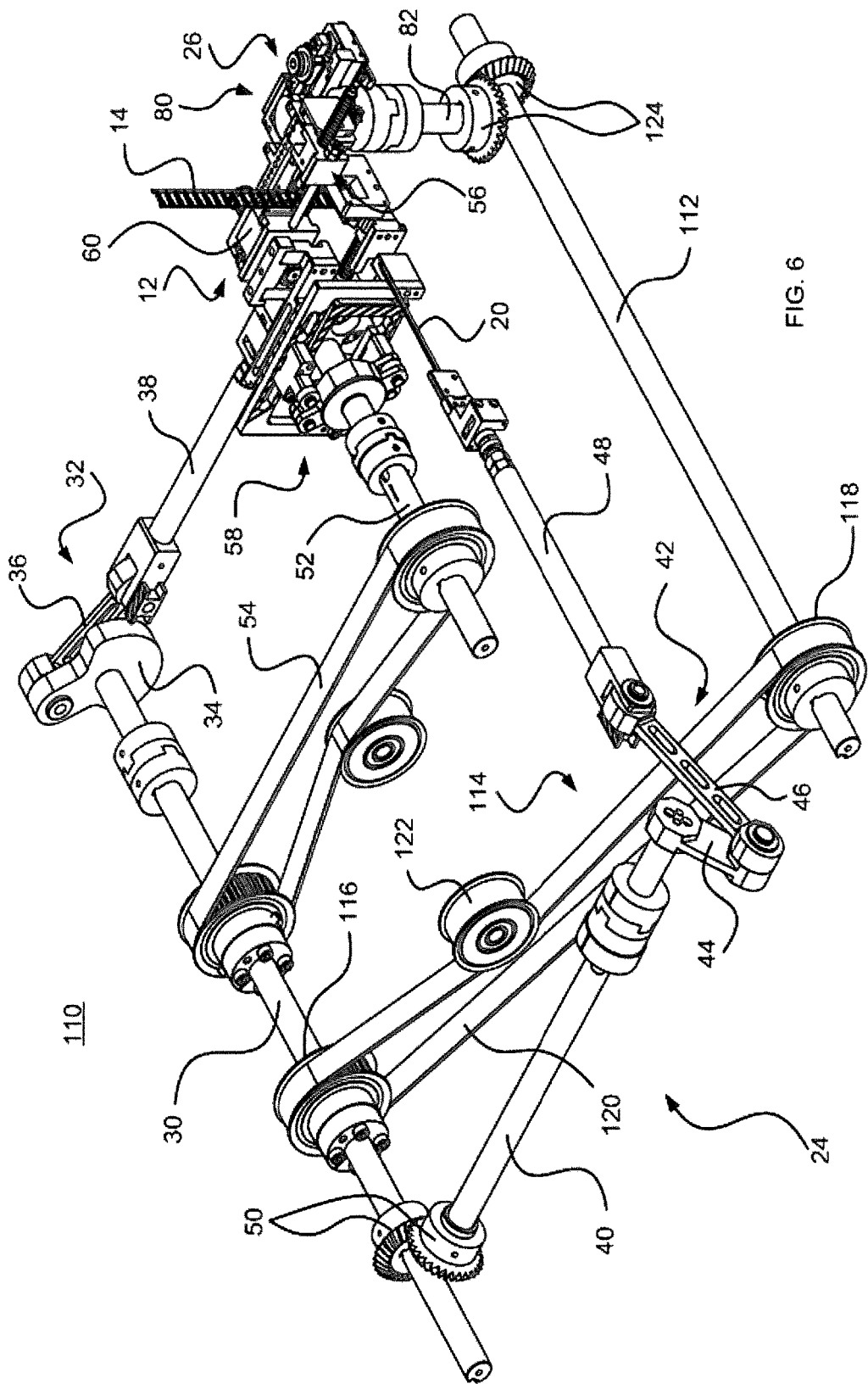
FIG. 6 is a schematic view from a second direction of the assembly apparatus of FIG. 5.

Referring now to FIGS. 5 and 6, an assembly apparatus 110 for component assembly is shown. The assembly apparatus 110 of the present embodiment differs from the earlier embodiment in that the drive mechanism 24 includes a fifth drive shaft 112 coupled to the fourth drive shaft 82, the fifth drive shaft 112 being arranged in use to synchronise movement of the second feeding mechanism 26 with the movement of the first feeding mechanism 12, the holding mechanism 16, the cutter 18 and the inserter 20.

Advantageously, by harnessing the various component processing elements 12, 16, 18, 20 and 26 of the assembly apparatus 110 to a single drive mechanism 24, the problems of timing and coordination typically faced when trying to sync various component processing elements is eliminated. This then makes it possible to increase assembly speeds with the assembly apparatus 110 without compromising quality of the assembled product.

In the embodiment shown, the fifth drive shaft 112 extends in parallel to the first or main drive shaft 30 and is coupled at a first end to the first drive shaft 30 by a timing belt pulley arrangement 114 that is arranged to transmit rotary motion of the first drive shaft 30 to the fifth drive shaft 112. In the present embodiment, the timing belt pulley arrangement 114 includes a first timing belt pulley 116 through which the first drive shaft 30 is received, a second timing belt pulley 118 through which the fifth drive shaft 112 is received, a second timing belt 120 coupling the first and second timing belt pulleys 116 and 118, and a first belt tensioner 122 that is arranged to apply a force on the second timing belt 120 to create or maintain tension in the second timing belt 120. In the present embodiment, the fifth drive shaft 112 is coupled at a second end to the fourth drive shaft 82 by means of second bevel gears 124. Although the use of bevel gears is illustrated in FIGS. 5 and 6, it should be understood by those of ordinary skill in the art that the present invention is not limited to coupling of the fourth and fifth drive shafts 82 and 112 by means of bevel gears. In alternative embodiments, the fourth and fifth drive shafts 82 and 112 may be coupled to one another by means of a sprocket and chain arrangement, an indexing drive or other motion transfer linkage means, for example.

As is evident from the foregoing discussion, the present invention provides an assembly apparatus that is able to achieve significantly faster assembly speeds than conventional systems. For example, the assembly apparatus of the present invention when used in an electrical connector assembly process is able to stably achieve assembly speeds of between 800 and 2,000 stitches per minute (SPM), compared to assembly speeds of less than about 500 SPM with conventional systems. The assembly apparatus of the present invention adopts a closed loop design such that various movements necessary for the assembly process are locked in and there is no "free-play" in which movements may be compromised resulting in poor quality of final assembled product. Advantageously, this makes it possible to increase assembly speeds using the assembly apparatus of the present invention without compromising quality of the assembled product.

The description of a preferred embodiment of the present invention has been presented for purposes of illustration and description, but is not intended to be exhaustive or to limit the invention to the form disclosed. For example, although the assembly of electrical connectors has been illustrated and described, it should be understood by those of ordinary skill in the art that the assembly apparatus of the present invention is not limited to electrical connector assembly. In alternative embodiments, the assembly apparatus of the present invention may be employed in other applications such as, for example, in the assembly of needles and syringes as well as other types of products that require similar assembly processes. It will be appreciated by those skilled in the art that changes could be made to the embodiment described above without departing from the broad inventive concept thereof. It is understood, therefore, that this invention is not limited to the particular embodiment disclosed, but covers modifications within the scope of the present invention as defined by the appended claims.

Further, unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. An assembly apparatus, comprising:
a first feeding mechanism arranged in use to feed a series of first components;
a holding mechanism arranged in use to hold consecutive ones of the first components in place;
a cutter arranged in use to separate individual ones of the first components while being held in place by the holding mechanism;
an inserter arranged in use to push a separated first component into a corresponding opening in a second component; and
a drive mechanism coupled to each of the first feeding mechanism, the holding mechanism, the cutter and the inserter and arranged in use to synchronise movement of the first feeding mechanism, the holding mechanism, the cutter and the inserter,
wherein the drive mechanism comprises:
a motor;
a first drive shaft extending from the motor;
a first assembly coupling the cutter to the first drive shaft and arranged in use to convert rotational motion of the first drive shaft into reciprocating motion of the cutter;
a second drive shaft coupled to the first drive shaft;
wherein the first feeding mechanism comprises:
a first cam assembly, the first cam assembly comprising a first cam, and a first frame having a plurality of sides, wherein the first cam is received in the first frame and has a surface profile that is in contact with each of the sides of the first frame at any point in time; and
a first feeder;
wherein the first cam assembly is arranged in use to convert rotational motion of the second drive shaft into rotary reciprocating motion of the first feeder.

2. The apparatus of claim 1, wherein the first assembly comprises a first crank and slider assembly coupling the cutter to the first drive shaft and arranged in use to convert rotational motion of the first drive shaft into reciprocating motion of the cutter.

3. The apparatus of claim 2, wherein the drive mechanism further comprises:
a third drive shaft coupled to the first drive shaft and extending transversely from the first drive shaft; and
a second crank and slider assembly coupling the inserter to the third drive shaft and arranged in use to convert rotational motion of the third drive shaft into reciprocating motion of the inserter.

4. The apparatus of claim 1, wherein:
the second drive shaft is coupled to the first drive shaft and extends in parallel to the first drive shaft, and
wherein the first cam assembly is coupled to the second drive shaft; and
the first feeder is mounted on the first cam assembly.

5. The apparatus of claim 1, wherein the first cam assembly further comprises a first guide coupled to the first frame, wherein the first guide is arranged in use to guide movement of the first frame.

6. The apparatus of claim 1, further comprising a locking mechanism arranged in use to lock the series of first components in place when the first feeder is not in engagement with the series of first components.

7. The apparatus of claim 1, wherein the holding mechanism comprises:
a first toggle mechanism coupled to the second drive shaft; and
a holder attached to the first toggle mechanism,
wherein the first toggle mechanism is arranged in use to convert rotational motion of the second drive shaft into reciprocating motion of the holder.

8. The apparatus of claim 1, further comprising a second feeding mechanism arranged in use to receive a series of second components and to position each of the second components to receive corresponding ones of the first components.

9. The apparatus of claim 8, wherein the second feeding mechanism comprises:
a second cam assembly coupled to a third drive shaft; and
a second feeder mounted on the second cam assembly,
wherein the second cam assembly is arranged in use to convert rotational motion of the third drive shaft into rotary reciprocating motion of the second feeder.

10. The apparatus of claim 9, wherein the second cam assembly comprises:
a second cam; and
a second frame having a plurality of sides, wherein the second cam is received in the second frame, the second cam having a surface profile that is in contact with each of the sides of the second frame at any point in time.

11. The apparatus of claim 10, wherein the second cam assembly further comprises a guide coupled to the second frame, wherein the guide is arranged in use to guide movement of the second frame.

12. The apparatus of claim 9, wherein the second feeding mechanism further comprises:
a stopper; and
a toggle mechanism coupling the stopper to the second cam assembly, wherein the second toggle mechanism is arranged in use to position the stopper to lock the series of second components in place when the second feeder is not in engagement with the series of second components.

13. The apparatus of claim 9, wherein the drive mechanism further comprises a fourth drive shaft coupled to the third drive shaft, the fourth drive shaft being arranged in use to synchronise movement of the second feeding mechanism with the movement of the first feeding mechanism, the holding mechanism, the cutter and the inserter.

* * * * *